(12) United States Patent
Boudville (10) Patent No.: US 8,708,224 B2
(45) Date of Patent: Apr. 29, 2014

(54) MOBILE DEVICE AUDIO FROM AN EXTERNAL VIDEO DISPLAY USING A BARCODE

(76) Inventor: Wesley John Boudville, Perth (AU)

( * ) Notice: Subject to any disclaimer, the term of this patent is extended or adjusted under 35 U.S.C. 154(b) by 104 days.

(21) Appl. No.: 13/506,921

(22) Filed: May 25, 2012

(65) Prior Publication Data

US 2013/0313313 A1    Nov. 28, 2013

(51) Int. Cl.
*G06F 17/00* (2006.01)
(52) U.S. Cl.
USPC ............... 235/375; 235/381; 235/462.14
(58) Field of Classification Search
USPC ............... 235/375, 381, 383, 462, 14–15
See application file for complete search history.

(56) References Cited

U.S. PATENT DOCUMENTS

| | | | |
|---|---|---|---|
| 7,469,829 B2* | 12/2008 | Silverbrook et al. | 235/432 |
| 7,487,112 B2* | 2/2009 | Barnes, Jr. | 705/26.8 |
| 7,680,324 B2* | 3/2010 | Boncyk et al. | 382/165 |

* cited by examiner

*Primary Examiner* — Daniel St Cyr (57) ABSTRACT

An electronic screen shows video that has a barcode wrapping an URL. A user images the barcode with a mobile device and decodes it into a web page with an audio feed corresponding to the video. Or the barcode wraps a phone number which the user's device contacts to get an audio feed. The web page lets the user pick between several audio feeds, where the feeds might be in different languages. Several users get audio feeds for the same screen. An electronic screen controlled by a user with a mobile device shows a barcode. Another user with a mobile device images the barcode and causes the screen to be 2 split screens, where the original user has one and the new user has the other. Each split screen can offer via barcode a separate audio track that can be heard by a user with a cellphone.

9 Claims, 2 Drawing Sheets

MOBILE DEVICE AUDIO FROM AN EXTERNAL VIDEO DISPLAY USING A BARCODE

REFERENCES CITED

"Service-Oriented Architecture" by T. Erl, Prentice-Hall (2004), 013-1428985.
"Understanding GPS" by E. Kaplan et al, Artech House (2005), 15805-38940.
"Two-dimensional color barcode and method of generating and decoding the same" by P. Cattrone, U.S. Pat. No. 7,478,746 (2009).
"System and method for decoding and analyzing barcodes using a mobile device" by 0. Attia et al, U.S. Pat. No. 7,287,696 (Oct. 30, 2007).
"Apparatus and method for printing two-dimensional barcode and articles incorporating such barcode" by G. Athens et al, U.S. Pat. No. 6,631,012 (2003).
"Clock free two-dimensional barcode and method for printing and reading the same" by D. Lopresti et al, U.S. Pat. No. 6,115,508 (2000).
"Optically readable two dimensional code and method and apparatus using the same" by M. Hara et al, U.S. Pat. No. 5,726,435 (1998).
"Display apparatus" by H. Mukawa, US Patent Application 20120044571 (Aug. 11, 2011).
"Colour barcodes and cellphone" by W. Boudville, U.S. patent application Ser. No. 13/374,207 (Dec. 16, 2011) ("207").
"Barcode and cellphone for anonymity and privacy" by W. Boudville, U.S. patent application Ser. No. 13/200,849 (Oct. 4, 2011), ("849").
"Using dynamic barcodes to send data to a cellphone" by W. Boudville, U.S. patent application Ser. No. 13/136,232 (Jul. 28, 2011), ("232").
"Cellphone changing an electronic display that contains a barcode" by W. Boudville, U.S. patent application Ser. No. 13/068,782 (May 16, 2011), ("782").
"Narrowcasting from public displays, and related methods" by T. Rodgriguez, US Patent Application 20100228632 (Mar. 3, 2010).
"Method and system for monitoring a display venue" by W. Redmann et al, US Patent Application 20110271295 (Nov. 4, 2009).
[The Web references are as of May 2012]
panasonic.com
samsung.com
sharp.com
sony.com
en.wikipedia.org/wiki/Beidou_navigation_system
en.wikipedia.org/wiki/Data_matrix_(computer)
en.wikipedia.org/wiki/GLONASS
en.wikipedia.org/wiki/QR_code
en.wikipedia.org/wiki/Voip
en.wikipedia.org/wiki/WiFi

TECHNICAL FIELD

This submission relates to the use of a cellphone to play audio that corresponds to the showing of video on an electronic screen.

BACKGROUND

Video screens are increasingly present in publicly accessible or publicly viewable places. Including in shop windows, bars and restaurants, buses and trains, and also as electronic billboards.

Often there might be no audio associated with the video being shown on the screen. Or the audio might not be audible to someone watching the screen. The reasons are several. One is that the owner of the screen might not be allowed to broadcast accompanying audio. For example, consider a billboard located outdoors. The broadcasting of audio might be considered too awkward or intrusive to pedestrians.

Another reason is that there might be a limit on the maximum volume of the audio that can be broadcast, where the limit is set by technology or local regulation. For example, a shop window containing a screen might have speakers or some other technology that can play audio only discernible to those very close to the window. Another example is in a bar. Some bars might have an ambient noise level loud enough that someone watching the video cannot hear the audio, even though the audio is being played. Another example could be a screen in a bus. For safety or convenience to the passengers and driver, there might be a maximum volume to the screen's audio. Or the audio speaker might be defective or turned off by the driver.

SUMMARY

An electronic screen shows video that has a barcode wrapping an URL. A user can image the barcode with a mobile device and decode it into a web page with an audio feed corresponding to the video. Or the barcode wraps a phone number, which the user's device contacts to get an audio feed. The web page lets the user pick between several audio feeds, where the feeds might be in different languages. Several users could get audio feeds for the same screen.

An electronic screen being controlled by a user with a mobile device shows a barcode that wraps an URL. Another user with a mobile device can image the barcode, access the URL and cause the screen to be 2 split screens, where the original user has one and the new user has the other.

Each split screen can have an audio barcode that lets multiple users get audio feeds for that split screen. The allocation of split screens to given users can depend on minimising various distances of existing and new users to the split screens.

Control of a split screen might be lost due to no or low activity. If so, a user listening to the audio from that screen might be offered control of the screen.

Closure of a split screen might cause its area to be allocated to one or more of its nearest neighbours.

The original screen can have a multi-screen ability. A first user initially has exclusive control of the screen. A second user causes the alternating of the use of the screen with the first user, where when a user controls the screen, only his video (and any corresponding audio) is shown (or played).

DETAILED DESCRIPTION OF THE PREFERRED EMBODIMENT

What we claim as new and desire to secure by letters patent is set forth in the following claims.

The submission has the following sections—
1. Base Implementation;
2. Multiuser Split Screens;
   2.1 Base Implementation;
   2.2 Screen's Speakers;
   2.3 Picking a Split Screen;
   2.4 Giving Up Control of a Split Screen;
   2.5 Closing a Split Screen;
3. Multi-screens;
4. Spreading an Audio Signal;
5. Extensions;

1. Base Implementation

Figure 1:
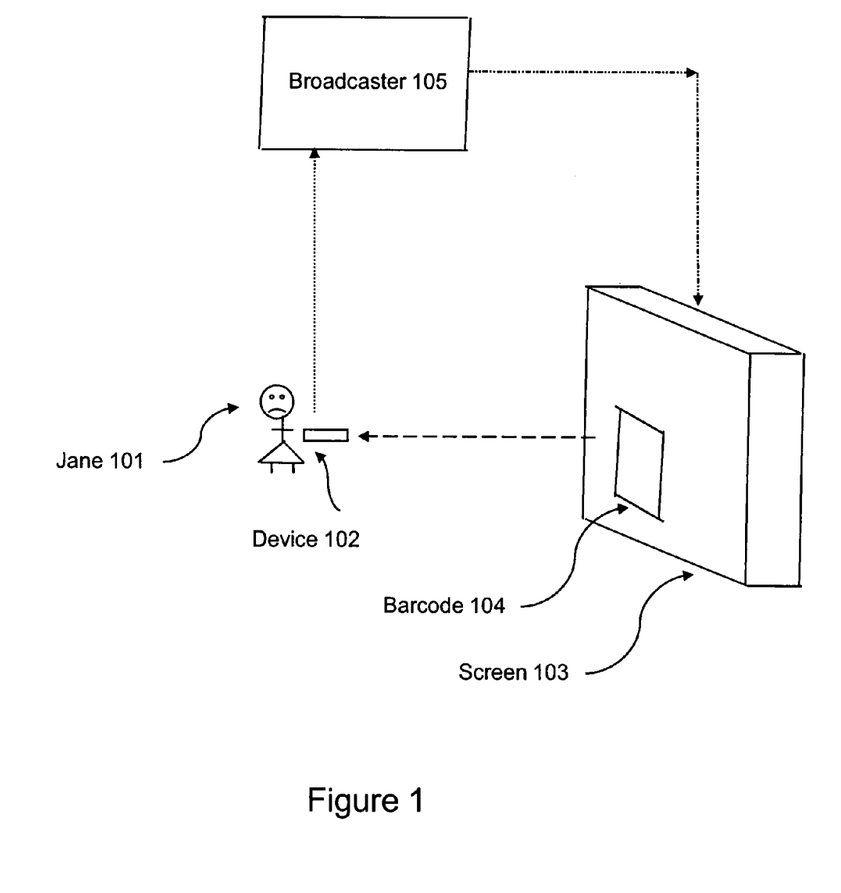
FIG. 1 shows a user Jane with a mobile device at a screen showing a video.

Consider FIG. 1. It shows a user, Jane 101, holding a mobile device, Device 102. She is looking at Screen 103, which is showing some video content. By 'mobile device', we mean a mobile, electronic communication device, where the communication is by wireless means. A common instantiation of a mobile device is a cellphone. Here, the term 'cellphone' includes the case of a smartphone. Other mobile devices include a laptop, netbook, electronic book reader or tablet.

We assume that one of the following is true. Screen 103 is not playing any accompanying audio. Or Screen 103 is playing audio, but it is not audible or not sufficiently audible to Jane at her current location. The latter also assumes that Jane is not able to or is unwilling to change her location to get closer to the screen. There might be obstacles in her way, for example. Simple cases of these are where the screen is set behind the bar in a restaurant, or hangs down from the ceiling, out of reach of Jane. Another reason that Jane cannot move closer could be that all the closer seats or locations are occupied.

It can be seen from these examples that Screen 103 is often an electronic screen. But it also encompasses the case where it is a projection. That is, Screen 103 is a flat, passive surface onto which an image is projected. Here, Screen 103 is "playing" audio in the sense that there is an accompanying audio signal being played by audio output devices near Screen 103.

The video is assumed to emanate from Broadcaster 105. This is an entity connected by some combination or wired and wireless means to Screen 103. Broadcaster 105 might be run by or be a television station, doing a wireless broadcast on some channel. Or it might be a cable TV provider. Or it might be on another type of electronic network, like the Internet, where it might be showing video to Screen 103.

An alternative but closely related configuration is where Broadcaster 105 is 2 entities in communication with each other. One entity has the video contents and communicates this to Screen 103. The other entity communicates with Jane's Device 102, preferably in a bi-directional manner.

The hardware of Screen 103 could be an electronic screen sold by manufacturers like Samsung Corp, LG Corp., Sharp Corp. and Panasonic Corp. If Device 102 is taken to be a cellphone, this could include models made by Apple Corp., including its iPhone™, Samsung Corp. and Nokia Corp. The hardware instantiated by Broadcaster 105 could include computers that function as web servers, as well as possibly controllers of Screen 103. These machines are made by a variety of companies, with microprocessors from, for example, Intel Corp. or ARM Corp. The web server software might be open source, for example Apache, or various proprietary implementations.

The first step in this submission is where the video signal continuously or intermittently shows Barcode 104 in some part of Screen 103. One implementation of Barcode 104 is a 2 dimensional barcode, where the latter might be a QR code or a Data Matrix code or some other type.

Barcode 104 encodes some data. Jane uses Device 102 to take an image of Barcode 104. It is assumed that Device 102 has the necessary camera to do this. Also, Device 102 has the attendant software to decode the image and extract the data. The barcode encodes a network address of Broadcaster 105. Without loss of generality, the address is in ASCII or Unicode form.

Currently, it is the state of the art that if a barcode encodes an URL, the decoding software recognises the standard URL prefixes (like http:// or https://) as indicating that the decoded string is in the format of an URL. The software brings up a browser inside the mobile device and loads the browser with that URL. Here, this assumes that the mobile device has Internet access, via a wireless provider or perhaps a third party like a WiFi provider (eg. at a cybercafe).

Following this approach, the Broadcaster can have a special URL encoded in Barcode 104. The URL goes to a web server controlled by the Broadcaster. In FIG. 1, this web server is implicitly depicted as part of the Broadcaster 105 symbol. The part of the URL to the right of the domain name or Internet address tells the web server to return a special web page to Device 102. This is shown in Device 102's browser, and the page contains an audio signal (or the page contains access to the audio signal) which is played by the mobile device. That audio signal is the companion to the video shown in Screen 103. An equivalent approach is where Device 102 does not show that web page, but just plays the audio. In both approaches, the audio is preferably in a streaming mode, as opposed to be a single file that is downloaded. For streaming, there might be from time to time, including possibly at the start of play, buffering of the audio stream on Device 102, prior to the device playing the audio.

In passing, why cannot the server just return an entire audio and video stream to the browser? The problem is that video consumes far more bandwidth, even when the image pixel dimensions are much less than in Screen 103. Plus, in a related way, this could be very expensive to Jane, if her wireless provider restricts the maximum amount she can download in a given period of time. Thus, if Broadcaster 105 just downloads an audio stream, perhaps wrapped in a lightweight format understood by Device 102, then if optimally done, this is little different in bandwidth consumption from Jane using the device for a pure audio conversation.

Latency is a potential problem, where this refers to the delay or lack of synchronisation between the video on Screen 103 and the audio on Device 102.

One optimisation might be for Broadcaster 105 to have web servers geographically distributed. When its central web server gets a request from Device 102, the URL can contain a code to the right of the domain name indicating the identity of Screen 103. It is assumed that Broadcaster 105 can control several screens. Each screen can be assigned a unique id, embedded in the URL and barcode that it displays. Broadcaster 105 maintains a database that maps each screen to its known location and to a nearby local web server. Preferably, this local server is also supplying directly the video content to Screen 103.

So in FIG. 1, the Broadcaster 105 symbol can represent a hierarchy or grouping of servers. The central server delegates the request from Device 102 to the local server closest to Screen 103. Hence the subsequent communication from the local server to Device 102 minimises the delay.

Another means of minimising the negative effects of latency is for the Broadcaster to offer audio preferably (or only) for certain types of transmissions. For example, the video might be a series of still images. Or if moving images are shown, they might not have human or cartoon figures visibly speaking. This reduces or eliminates the possible asynchrony between seeing the images and hearing the audio.

Another method stems from the observation that most video and associated audio is prerecorded. Very little displayed video is truly "live". Hence when Broadcaster 105 returns an audio stream to Device 102, this can be synchronised so that when it leaves the server, it is ahead of the corresponding video that will go to Screen 103. This assumes that the audio signal going from the server to Device 102 will take longer than the video signal to Screen 103. In part, because the latter can be expected to traverse via more of a wired path than the former. There could be anticipated to be greater bandwidth available, and thus fewer collisions, along the wired path, as compared to the wireless connection experienced by Device 102.

How far ahead should the audio signal be? One way is for the Broadcaster to have predetermined typical delays for each region that its screens appear in. The delays might also be functions of the day of the week or the time of day. Or perhaps also functions of special events, where there might be greater wireless traffic and thus greater expected delays for wireless signals.

An elaboration is to let Jane empirically increase or decrease the delay of the audio she gets, relative to what she sees on Screen 103. The web page on Device 102 can have software buttons or links to do this.

The Broadcaster can also use this feedback from Jane and others to adjust delays seen by other users. Both at Screen 103 and at other nearby screens. This might be done in real time or near real time as possible. Also, the feedback data from the users might be stored, and used to produce delays for those screens at other times. Here, the storage might be done in such a manner as to remove any personal identifying characteristics of Jane or other individuals. The storage might be of average feedback responses, for example.

Note from FIG. 1 that Screen 103 has no associated cameras and other hardware and software that do image capture and analysis of nearby users. Thus the configuration of FIG. 1 has simpler hardware requirements than other systems which might perform such analysis.

Above, we spoke of Barcode 104 encoding an URL. In other instances, it might encode a phone number. When the decoding is done and a phone number is detected, then Device 102 could ring this number. The resultant audio emanating from the number is then played by the mobile device, if the device is a cellphone or some other device capable of playing audio.

Once a phone number is detected, the mobile device might be able to make a choice between using the phone provider to make the call, or using Voice over Internet Protocol (VoIP), where the latter might be done if the device's wireless connection is via WiFi. VoIP might be cheaper in some circumstances, like for long distance calls.

An advantage to Jane of her device calling a phone number, as opposed to making an Internet connection to an URL is that if she does the latter via her wireless provider, this could be more expensive. Whereas she might have a flat rate plan (unlimited talking time) for making conventional phone calls.

How to detect a phone number? Several heuristics could be used. For example, if the decoded data is seen as a string of digits in a standard format typical for the region or country that Jane is in. This format might include spaces or other separator symbols. Examples for the US could include "555-123-4567" or "(555)123-4567" or "5551234567". Other examples might omit the area code. In this case, the area code used would be one appropriate for the geographic region that Jane is in. If her mobile device can make a wireless phone call, this would be to a wireless basestation, which would know its area code or codes. Where the latter could be for the case of overlay codes in a region.

Another way is the use of a format mimicking an URL. For example, "phone://555.123.4567". It should be stressed that this example is illustrative, and does not imply an endorsement of the present submission by any official Internet standards body.

The above cited examples of a phone number have a drawback. In general, they do not identify the specific screen on which the barcode appeared. Whereas consider the case where an URL is, for example, "http://shop5.com/b/jKie3". Here, the shop5.com is assumed to be the website of the Broadcaster. The rest of the URL contains a string that the website maps to the specific screen that showed the barcode. This is necessary since in general the website will control several screens, at that and other locations. The use of a pure phone number, like 555-123-4567 is equivalent to the barcode just encoding an URL like "http://shop5.com".

To overcome this, if the barcode encodes a phone number, there could be extra digits appended. The current equivalent of this is where when one makes a phone call and one encounters an answering program that asks the user to press various buttons to make choices between proffered options. In the current submission, there could be extra digits appended in a way that adheres to some published format, like "555-123-4567-893851", where here the "893851" digits identify the screen of the barcode. The software on Jane's device can parse and store the extra digits in memory while making the phone call. When the call is accepted by a program at the other end, Jane's device transmits the extra digits. It can be seen that the memory capacity of most current mobile devices is entirely adequate to hold these extra digits.

An alternative to Jane's device holding the extra digits while making the call is simply for the device to transmit those digits with the call's digits. There is one minor caveat. The ability of the phone provider's hardware and software to store extra digits appended to a phone number is likely to be [far] more limited than the capacity of Jane's device. And this limit might vary with the hardware and software of each wireless provider. This could be relevant where the Broadcaster controls screens distributed across a nation, with different wireless providers.

A counterpoint is that only a few extra digits might be needed. Each digit is a power of 10 in addressing. So if for example the Broadcaster will never control more than 100 000 screens, 5 digits will be adequate. And if the Broadcaster can ascertain that all the wireless providers can handle holding an extra 5 digits, then this could be implemented.

In passing, one way to avoid the need for extra digits to identify the screen is where each screen is allocated its own phone number. Given the cost of obtaining phone numbers, this option is unlikely.

If a cellphone is used to play the audio, there could also be a means via the phone keys for Jane to provide feedback to the Broadcaster about adjusting the latency. The use of the phone keys follows the standard approach of many conventional telephone finite state machine applications.

If audio tracks are available in different languages, or in different accents of a language, then these could be made available to Jane. Though she could only typically make 1 choice at any given time. In FIG. 1, there could be several barcodes, one for each choice. Or, there might be 1 barcode. Picking this produces a webpage on her device where she can then choose from different languages or accents.

One refinement is where she can pick mono or stereo audio. She might have the ability to play stereo audio on her device. As above, this choice could be made via 2 barcodes in FIG. 1, or by 1 barcode that produces a webpage in which the choice is then made.

The choices in the previous 2 paragraphs can be combined.

An elaboration is where Jane's mobile device can play 2 mono audio signals simultaneously, where the usual context is that these are the left and right signals of a stereo audio stream. Now in contrast, she can pick a mono audio stream for the left ear, and a different mono audio stream for the right ear, where these might be in different languages. Or, one mono stream might be a pure sound track, with no spoken content, and the other mono stream might be spoken content.

The picking of these could be via the initial picking of 1 barcode on the screen, followed by picking the 2 mono choices from the resultant webpage.

Earlier, we described the barcode appearing on Screen 103 either continuously or intermittently. The latter might be at some regular periodic time interval. Another option is for the screen to have a mechanical button that when pressed brings up a barcode, that will appear for some time interval. This assumes that the screen is physically accessible to someone who can then press that button. Or, the screen might have a remote control, like a television, where the latter has a hard-wired button or a software enabled option that when picked will bring up the barcode.

A variant is where one or more screens are electronically controlled by a central location different from the Broadcaster of FIG. 1. Here suppose the screens are all in a bus or train or building, and the central location is by the driver or in a maintenance room of the building. The Broadcaster might be remote to this entity, and might be serving signals to several such entities. For simplicity, this configuration is not shown in FIG. 1. The driver or operator might be able to manually control the depiction of the barcode on the screens, or to remove this depiction.

In "207" we described how a barcode could have extra colours, beyond the standard black and white. Where these extra colours could be used to draw a symbol or glyph on, say, only the black rectangles or only the white rectangles. Where the overall barcode could still be decoded. The symbol would be recognised by the user, Jane, while the barcode would be decoded, as before, by her device. Here, the symbol could be suggestive of audio. For example, a stylised representation of a ear.

Earlier, we discussed how there might be different audio tracks for the screen, where each track was represented by a different barcode. Implicitly, the barcodes were at different positions on the screen. An alternative is to have some or all of them at the same position, but appearing at different times. To let Jane understand what each barcode encoded, a barcode could have appearing outside it, or over it (in the manner of the previous paragraph), text or a symbol. If the barcodes encode different languages, then the symbols might be, say, flags (or cartoon representations or summaries of those flags) of countries associated with those languages.

Another aspect is where Jane can adjust the barcodes visible on the screen. She might do this in response to verbal requests from nearby users with mobile devices. Perhaps one such user has a camera in his device with insufficient resolution to properly image an existing barcode, given that user's distance from the screen. Another reason might be that the user's device can image the barcode, but cannot decode that particular encoding. For example, the device might not be able to decode a QR barcode, but could decode a Data Matrix barcode.

For these and other reasons, Jane could via the web page on her mobile device alter the barcodes on the screen. One option might let her increase the size of a barcode. Another might change the encoding, from QR to Data Matrix, for example.

When a barcode is altered on the screen, this might be achieved by a temporary graphical window appearing on the screen, as an overlay over the pre-existing video, the overlay containing the new barcode. The window might disappear after some time, where this time could be pre-set to some default or also adjustable by Jane.

Similarly, if instead the barcode is actually altered, that could be for some temporary time, after which it reverts to its earlier form.

The previous steps could be done for several barcodes simultaneously, if the screen is already displaying several barcodes and if Jane uses her web page to issue such instructions.

2. Multiuser Split Screens 2.1 Base Implementation

In the previous section we described the use of Screen 103 by one person, Jane, with a mobile device. This was in the context of Jane essentially having no control over the video (or still images) in Screen 103. The emphasis was on letting her get audio. This section expands the functionality by letting Jane control the video, and letting others also control portions of the screen, and to get audio signals.

We now go to the context of our submission "782", a summary of which is given here. The reader should consult the text of "782" for a more detailed description. In "782", there is a configuration similar to FIG. 1 of the current submission. When Jane takes an image of the barcode, her device brings up a browser, which goes to the URL decoded from the barcode. The web server of "782", which is equivalent to Broadcaster 105 of the current submission, returns a web page of controls to her mobile device, while also showing an initial still image, or the web server commences playing a video on Screen 103. Jane can now use the web page to control what is being shown on Screen 103.

While she does this, Screen 103 can show a barcode, along with other imagery. This barcode can be used by other users with suitable mobile devices. The barcode encodes the address of an audio stream, as described earlier. Jane does not need to use this barcode, since her device shows the controlling web page, which can also have an audio stream that is played by the device. This barcode lets other users listen to what Jane is hearing as she controls and changes the screen.

It is possible for the screen to be simultaneously manipulated by several users. Suppose in FIG. 1 that in addition to Jane 101, 3 other users with mobile devices equivalent in functionality to hers approach the screen and also want to interact with it, independently of her and each other. This differs from the case where, for example, Jane and another user might be playing a game on the screen.

We use the term 'split screen' to refer to the area of a physical screen under the control of a given user.

Broadcaster 105 might enable the following split screen use of Screen 103, up to some maximum number of users. This number could be set empirically. It could be in part a function of the total numbers of pixels along the horizontal and vertical directions. Where roughly, the larger these numbers, the greater the ability of the screen to support independent interactions. For this discussion, we shall take this maximum number of users to be 4. Other choices are possible.

Other factors that could influence the maximum number include the amount of memory or disk space associated with the screen.

Note that if Broadcaster 105 controls several screens, of different sizes, then different screens might have different maximum number of users.

Figure 2:
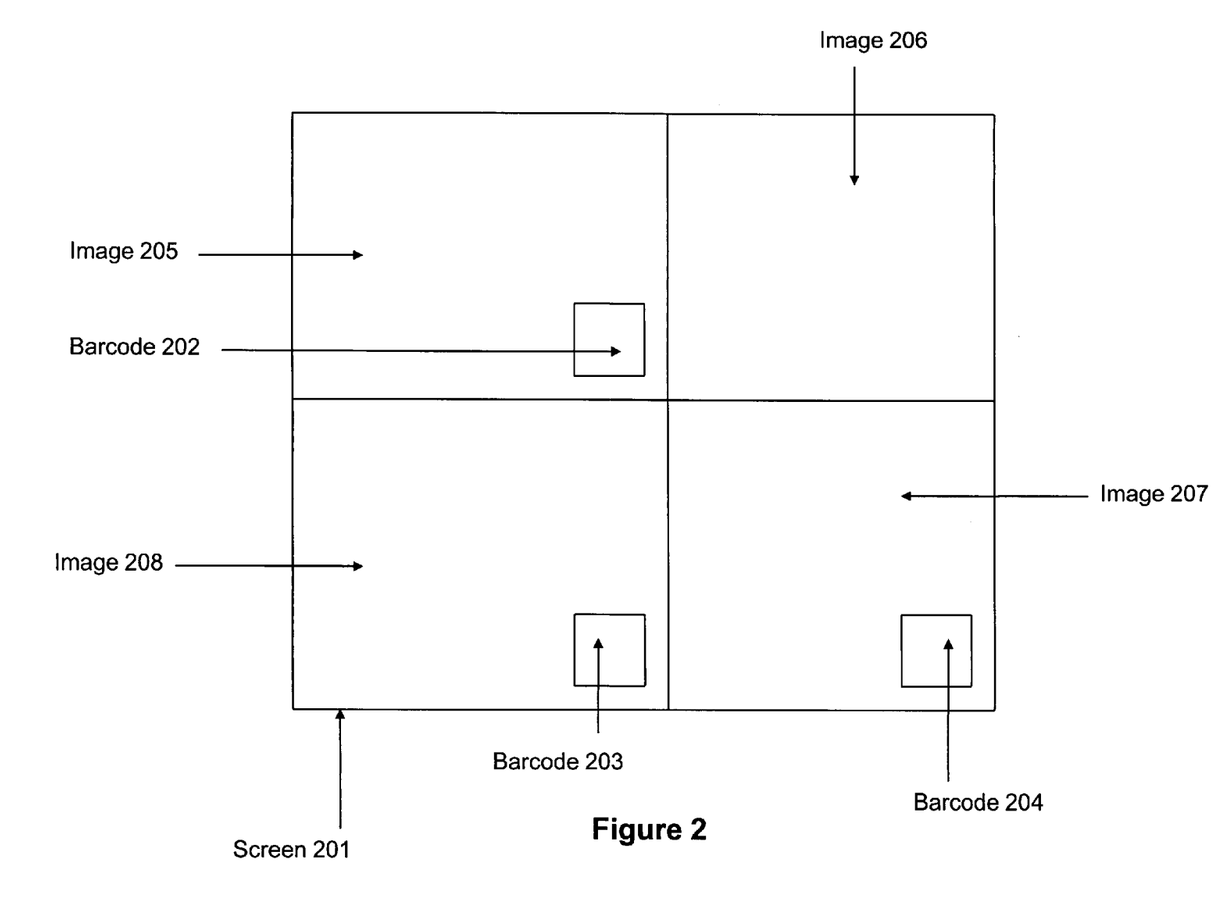
FIG. 2 shows a screen with images and barcodes being seen by several users with mobile devices.

FIG. 2 shows Screen 201, which is Screen 103 from FIG. 1. It is divided into 4 roughly equal areas, in which Image 205, Image 206, Image 207 and Image 208 are simultaneously shown.

One way to produce this starting from the situation of FIG. 1, where one user (Jane) sees one image on the screen, is to imagine that while she is manipulating that image via her mobile device, in which a web page of controls is sent by Broadcast 105, the image also shows a split screen barcode. This is different from the audio barcode discussed in the previous section, which was to obtain an audio signal. When another user with a mobile device containing a camera takes a photo of the split screen barcode, Broadcaster 105 then splits the screen into 2 areas. Jane's interactions are now with an image in one area, and the new user's interactions are with an image in the second area.

In one or both areas, a barcode might appear to let other users get an audio signal for that area, where these users cannot control the video for the area.

If Broadcaster 105 permits more users, then another split screen barcode can be shown. This could appear in the area of the screen used by the first user, or by the second user. The split screen barcode might appear continuously or intermittently. It might have a symbol or text written near it, or on its rectangles in the manner described in "207".

Thus a given split screen might have 2 barcodes appearing in it at the same time. One barcode lets others get an audio feed, the other barcode is a split screen barcode. Or, when both appear intermittently, this could be at the same location, with the barcodes appearing in alternate order. In this case, the time duration for which the audio barcode appears might be different from the time duration for the split screen barcode. The durations might also be different when the barcodes appear at different locations.

Continuing this with 2 other users gives us FIG. 2. Without loss of generality, the first user, Jane, is now interacting with Image 205. The second user interacts with Image 206. The third user interacts with Image 207 and the fourth user interacts with Image 208. There is no particular significance ascribed to the position on the screen of the image that a given user is interacting with.

Here, the 4 users are allocated regions of equal area on the screen. This is not a necessity. If there are 3 users, for example, then one user might get the entire upper half of the screen (the combined area of Image 205 and Image 206), while the 2 other users subdivide equally the lower half.

In FIG. 2 are audio Barcodes 202, 203 and 204. Barcode 202 is in Image 205. Suppose another user, Ralph, who is not one of the 4 users currently interacting with the screen, wants to hear the audio for Jane's interaction with Image 205. He has a suitable mobile device with a camera. He takes a photo of Barcode 202. It wraps an audio stream, which is then played on his device, as described in Section 1.

Other users might also approach the screen with their mobile devices and do likewise.

Note that Image 206 does not have an audio barcode. This could be because there is no audio stream associated with the image. Or because there is audio, but the user controlling Image 206 has the ability via her controlling web page to prevent others from listening to it. It is primarily a policy decision by Broadcaster 105 whether to give users who control a screen or parts thereof the ability to deny others the means to listen to any associated audio.

Note in FIG. 2 that the barcodes are not placed close to each other. This is to reduce the chances that a user who takes an image of a barcode for a desired split screen accidentally images a neighbouring barcode.

An alternative to having audio barcodes in the split screens is to have one audio barcode present, either continually or intermittently, in some location on the overall screen. If a user images this with his mobile device, the latter brings up a web page with a schematic of the overall screen, depicting the various split screens. He can then pick a split screen from which he wants to hear the audio. If a given split screen has no audio, as in the example of Image 206, then the schematic might depict in some manner that that split screen cannot be picked to hear audio from. It can be appreciated that common graphical user interface methods permit the graphics of this paragraph to be easily implemented. Each split screen in the web page schematic can be shown as selectable (or not as the case may be) when the user moves over it, for example with his finger or stylus, if his device has a touch screen, or with the equivalent of a mouse (eg. by tabbing through the selectable widgets using a key on the device).

The advantage of the previous paragraph is that by reducing the number of barcodes in FIG. 2, it reduces the visual clutter, or the perception of there being visual clutter. While the perception is subjective, its reduction still constitutes an improvement of the overall user experience. But it entails an extra step by the user in having to manually pick the desired split screen that he wants to listen to.

In a related way, consider a user who has been able to get an audio signal for a split screen onto his device, by any of the above means. If a web page appears on his device, as part of that process, there could be an option on that page, like a selectable link to another web page, that lets him pick the audio from another split screen. The user interface method of doing so could be via the method of the second paragraph before this one. Easier for the user than having to reposition his device and take an image of the desired audio barcode in FIG. 2.

Returning to FIG. 2, there could be a depiction near each audio barcode, or over each, using colour in a barcode in the manner of "207", of how many users are currently listening to each split screen. This lets new people approaching the screen as well as current users quickly assess the popularity of each split screen. This depiction might appear continually or intermittently. If the split screens do not show any audio barcode, then there still might be some location in each split screen where the number of listeners is shown.

The split screen and audio hookups are very different from conventional split screens. The latter have been shown for decades on news programs on television, for example. Typically one portion of the screen shows one person talking to another person in the second portion of the screen. The audio track for this is essentially one audio stream. (This is true whether the audio encodes mono or stereo.) Also, both video sections of the split screen are closely related, as in this common example.

In our present disclosure, each audio stream accessible from the barcodes in FIG. 2 is completely independent of an audio stream that comes from a different barcode. There is no analog of this in the previous state of the art configuration. In part because the latter has one set of speakers associated with the screen, that plays the audio. Even if, for the sake of argument, a conventional split screen shows 2 independent videos, with 2 independent audios, the combining of the audios and playing the result on one set of speakers is likely to mostly produce noise.

The present disclosure circumvents this bottleneck by directing the independent audio streams to different mobile devices, with one audio stream going to one mobile device, and a different audio stream going to a different mobile device.

Above, we discussed a barcode being made visible on Screen 103 for either letting the user get a split screen or for an audio stream for a split screen. If, for various reasons, the Broadcaster decides that no more split screens will be made, or no more audio streams for a given split screen or for any split screen, then the corresponding barcode might be removed from Screen 103. Or it might be shown, but in deliberately degraded form, where this means that it cannot be decoded correctly. In this way, albeit indirectly, users who get allocated a split screen or audio stream can exercise some control over the display of barcodes.

The previous paragraph differs from the case where a barcode causes a web page to appear on the user's device, where in that page she can choose, for example, to ask for an audio stream or a split screen. In this case, if the policy of the Broadcaster is that all the selectable options on that page would be no longer selectable, then, as in the previous paragraph, the Broadcaster might remove or 'turn off' the barcode on the main screen. But if some options would still be selectable, then the Broadcaster would let the barcode be selectable and enable the display of the web page on the mobile device.

Above, we treated the case where several users could get the same audio stream for a given split screen. This can be generalised to when each such user gets a different audio stream. Where these streams are still associated with the same split screen. This can be achieved using the same audio barcode for the split screen. The server gets the audio requests in some time order from several users. It can accordingly allocate different audio streams to each.

2.2 Screen's Speakers

From the start of Section 1, it can be seen that in some implementations of FIG. 1, Screen 103 has no associated speakers. But suppose the screen does have speakers. As discussed, it is meaningful for the speakers to only play one audio signal (mono or stereo) at a time. One of the users, say Jane, might be given the ability via the web page on her mobile device to also control the audio to be played, or that is currently played on the speakers. This includes being able to turn on or off the speakers; to alter the volume, including of each speaker, if there are several; to only play mono, even if a stereo signal is available and the hardware is capable of playing stereo. If the speakers have orientations that can be varied, then these might also be controllable from Jane's web page.

Her web page might also let her hand off control of the audio speakers to a user currently controlling another split screen. This could be done via a control on her web page that lets her designate another current split screen. So she does not need to know anything about the user of that other split screen. In general this is desirable, because Jane and the other users might be mutual strangers, who coincidentally happen to be at the same screen.

When she does this hand off, the targeted user might get an altered web page on his mobile device, where the changes tell him of his new abilities.

This can be extended to the Broadcaster web server making a decision to allocate control of the screen's audio speakers to a given user, who is assumed to be currently controlling a split screen. This decision might also involve the removal of such control from another user. In both cases, the web pages in those users' mobile devices might show updates informing the users of these changes. The updates could preferably include the removal or disabling of associated audio controls from the user from whom control is being taken, and the insertion or enabling of such audio controls to the user to whom control is being given.

The decision by the web server could be influenced in part by inactivity or a low level of activity by the user currently controlling the speakers. It could also be influenced in part by active use by another user of his split screen, where this user controls the split screen. There could be various heuristics used by the web server to define what "low level" or "active" means.

Another possible factor in deciding to allocate control of the speakers to a given user is where the users controlling the split screens bid for the right to control the speakers. The bidding could be in terms of money or some other asset class.

Another reason might be that a user gains control of the speakers by logging into the web server or by performing a transaction. Or having a record of more previous transactions with the Broadcaster's company than the current other users controlling the other split screens. Another possible metric is not the simple count of previous transactions, but the total monetary value of those events.

Another possible reason for a user losing control of the speakers is that the Broadcaster has a maximum time limit for a user to control the speakers. In some implementations, the user may be able to extend this time limit by purchasing more time, using his mobile device to make an electronic transaction with the Broadcaster.

Note that if a user gets control of the speakers, he might have the ability to decline such control, while still retaining control of his split screen. Specifically, when a user gets a web page that also gives him control of a split screen, the page might have an option that lets him indicate whether he wants control of the speakers. If he declines, this simplifies the decision logic by the web server.

The web server can make available one or more split screens as a data feed, including as a Web Service, where this is shown on another screen, or as a web page. An adjustable time delay might be deliberately introduced into this feed by the server.

For example, if the Broadcaster is a retailer and the various screens let Jane and others search its catalog of items, then a web page might show remotely what users near the retailer's screens are searching for or looking at. The screens might be in the retailer's shop windows.

Above, we discussed how one user of a split screen could have exclusive control of the entire screen's speakers. Similarly, that user, who we take to be Jane, might be able to affect or control what can be shown in other split screens. This control might be by explicit actions on the part of Jane, or implicitly by her performing actions like deciding what she sees on her split screen.

The explicit actions could arise from options presented to Jane on her device's web page. These options could let her restrict what other split screen users can see on their split screens. For example, if all the views on any split screen are derived from a retailer's catalog, then Jane might be able to set a parameter so that whatever catalog page appears on her split screen (which is NOT the web page on her device) cannot be shown on another split screen.

An implicit equivalent of the previous paragraph is where the Broadcaster has set a policy so that once a catalog page appears in any split screen, then that page cannot appear in any other split screen (of that physical screen).

A generalisation of the 2 previous paragraphs arises if the users are looking through a database arranged as a tree or "forest" (=set of trees). A catalog might have such a hierarchical structure. If Jane is looking at a branch node of the tree in her split screen, then other users might be prevented from looking at or descending into the children of that node, in their split screens.

2.3 Picking a Split Screen

Earlier, we described the making of one or more split screens on the main screen. Here, we describe in more detail how new split screens might be allocated. Suppose we start with FIG. 1 and one user, Jane, who has the entire screen. Another user, Dinesh, with an appropriate mobile device, walks up and takes an image of a barcode, in order to get a split screen. Imagine that the Broadcaster makes 2 split screens, in a 1 row×2 column geometry. So, when facing Screen 103, there is a left split screen and a right split screen.

Which one is allocated to which user? There are several possibilities. One is that priority is given to the existing user, Jane. And that she gets the split screen closest to her.

This assumes first that the Broadcaster knows the location, orientation and dimensions of Screen 103. The Broadcaster can use whatever means external to and preceding the operation of this submission, to precalculate those values. Also, when the Broadcaster makes a split screen, it knows the location and geometry of it. Hence the coordinates of the center of mass of each split screen can be found, to represent that split screen's location. These coordinates can be used to find the distance of the split screen from another point in space.

The Broadcaster also needs to know the location of Jane's Device 102. Suppose Device 102 knows its location. Perhaps using the Global Positioning System (GPS) or some other satellite navigation system. Like the Russian Glonass, the Chinese Beidou or the European Galileo. The location might also be found by combining signals from different satellite systems. Also, use of local, non-satellite means like the wireless phone network, might also be made. If the Broadcaster can programmatically and wirelessly query Device 102 for its location, and if the device has been authorised by Jane to reveal such information to an entity like the Broadcaster, then the latter now can find the split screen closest to Device 102. That is now allocated to Device 102, and the image that was previously entirely on Screen 102 is redisplayed on the split screen, to the extent that this is possible.

If the full image cannot be entirely shown on the split screen, then as much of the image as possible might be shown on the split screen, and the controlling web page on Device 102 might have sliders in the horizontal and vertical directions to let Jane adjust the viewing port of her split screen on the underlying image. Or equivalently, the sliders might be implemented by various hardware or software keys or by using haptic abilities (if any) of Devices 102's touch screen.

Another policy is that priority is given to the new user getting the split screen closest to him. The steps for doing so are as earlier for the pre-existing user.

Another possibility is that the Broadcaster minimises the sum of the distances from the pre-existing and new users to their allocated split screens.

Now suppose that the policy was to minimise the distance of the pre-existing user to her split screen. But the Broadcaster is unable to get her location. (Either her device does not know it, or it will not give it up.) The Broadcaster can then devolve to minimising the distance of the new user to his split screen.

Similar methods can be done if the policy was to minimise the distance of the new user to his split screen, but his location cannot be found by the Broadcaster.

If the Broadcaster is unable to find the locations of both users, then it might randomly allocate the split screens.

The above was for the simplest case and possibly most important case of one pre-existing user and one new user. This can be generalised in the obvious ways to where there are several pre-existing users and one or more new users. In general terms, an overall strategy for the Broadcaster is to minimise the total of the distances from the split screens to an assignation to the users, using as much information about the locations of the latter as it can find.

2.4 Giving Up Control of a Split Screen

We now describe what might occur when control is given up of a split screen. One reason is low activity or inactivity over a certain duration. Here, the controlling user might have simply walked away. Another reason is that the controlling user has a web page with an option that lets him give up control, and he has exercised this.

Another reason could be that a new user, Mike, has approached the screen, but has been unable to get a split screen, because the maximum number of such screens already exists. When this maximum is reached, the main screen might intermittently or continuously show a barcode. When Mike images this, a web page appears on his device telling him of the limit. It could offer him a means of electronically asking current split screen users (and who are controlling those split screens) to voluntarily relinquish control. If Mike picks this, the Broadcaster might update the web pages of the users controlling split screens, asking one of them to do so. The Broadcaster might also insert this into their specific audio streams. Note that if the Broadcaster does this, it does not do so to the audio streams of users who are listening to but are not controlling split screens.

The Broadcaster might offer incentives to a controlling user to give up control. This could include using a points system. Whereby the user gains points that he could later use, at this or other screens controlled by the Broadcaster, to gain control.

When Mike asks the Broadcaster, as above, to get control of a split screen, the Broadcaster might choose to ask only users controlling specific split screens. This could be on the basis of current levels of activity. So a user with the lowest level of activity compared to other split screen controlling users might be asked first to give up his split screen.

When the Broadcaster has made a decision to change the control of a given split screen, or that screen's controlling user has decided to give up control, then any users currently listening to that split screen might get an update to their web pages and in their audio telling them of this.

If the control will change because of low activity or no activity and not because of a new user, and there are users listening to the audio, then the Broadcaster might ask one or more of them to see if any wants to take control of the split screen.

If the control might change because of Mike, and there are several listeners, then the Broadcaster might poll these to vote on whether they want to still listen to and view the current choice of the split screen. The results of this might be used to override Mike's request for control.

If the split screen has no listeners, and there is no Mike wanting to take control, then the Broadcaster might have a policy to ask listeners of other split screens, to let one of them take control of this split screen. If no listeners pick this, then we go to the next option of possibly closing the split screen. Or, instead of asking other listeners, the Broadcaster's policy might be go to the next option.

2.5 Closing a Split Screen

We now describe what might happen to make a decision to close a split screen. One reason is inactivity for a certain duration. Another reason is that the person controlling a split screen could have an option on his web page that lets him relinquish control. It has to be expected that some users will simply walk away from the screen instead of exercising this option. Hence the need for the Broadcaster to have a measure of inactivity as another reason for closure. These reasons are the same as above for the case of the change of control of a split screen. Here, furthermore suppose the split screen has no listeners.

Instead of closing the split screen, the Broadcaster might have a policy to leave it unused. Possibly to allocate to a new user who walks up and wants to control a split screen. This also leaves undisturbed the current usage of the other split screens. The disadvantage is that there is an underutilised or non-utilised area of the overall screen.

If the split screen is left unused, the Broadcaster might change it in some visual manner, to indicate that it is unused. Other listeners of other split screens might see this and later take control of it. The latter can be done preferably via the web pages on their devices, which is easier for them than taking an image of a barcode. Also, the Broadcaster might put a barcode in the split screen, that lets a new user, who does not have a web page on his device from the Broadcaster, take control of it.

Suppose the Broadcaster will close the split screen. The policy could be to allocate its area to one or more of its neighbours. Preference could be given to neighbours that have the maximal length of adjoining edges. In FIG. 2, suppose the split screen for Image 207 will be closed. The preferred neighbours will be the split screens for Image 206 and Image 208.

One policy would be to allocate all of the split screen area to one of those preferred neighbours. If there are several, a neighbour could be chosen at random. So for example, Image 207's area is now given to Image 208, which can now double in size. Or the area might be allocated to the neighbour split screen with the highest current activity.

Another policy might be to divide the split screen area between two or more of the preferred neighbours. A caveat might be that this would only be done if the resultant shapes of the neighbours would be rectangular, assuming that the current shapes are rectangular. This derives from a preference for rectangular split screens. It can be seen from the above example of Image 207 that it is not possible to allocate its area between Images 206 and 208 and have both remain rectangular.

In another split screen geometry this could be possible. Imagine that instead of FIG. 2's grid of 2×2 split screens, there were 4 split screens, with each being a vertical strip, going from the top to the bottom of Screen 201. In this 1×4 geometry, a split screen with neighbours to its left and right could have its area allocated to both, with both remaining rectangular.

3. Multi-Screens;

The previous section described how split screens could be obtained from or in one physical screen. This section expands by offering the means of having multi-screens. Suppose we start with FIG. 1, where Jane controls the entire screen. Another user, Dinesh, with a suitable mobile device, also wants to use the screen. He takes a photo of a barcode that offers a multi-screen option.

This might be decoded to an URL, which causes his device to go to the Broadcaster and request a web page, which the device shows on its screen. This offers Dinesh the ability to share Screen 103 with Jane on an alternating basis. When Dinesh controls Screen 103, Jane's imagery is temporarily removed. Dinesh then can manipulate Screen 103, and get audio, in the same manner as Jane, as discussed earlier. During this time, though Jane cannot see her imagery, her device might still play audio specific to that imagery.

Another possibility is that her device plays the audio being heard by Dinesh. Here, Dinesh might have the means via his web page to control whether Jane can listen to his audio or not. In turn, at a higher level of control, the Broadcaster might set a policy as to whether Dinesh has this means or not. This could be a function of the material that Dinesh is looking at.

Above, when the screen still shows Jane's imagery, and Dinesh is about to assume control of the screen, Jane might be alerted via a message on the web page on her device and possibly also on the screen. Also, a warning might be inserted into an audio stream that Jane is listening to. This message might tell her that she can resume control after some period of time.

Via her web page, Jane might be offered an option to continue interacting with the Broadcaster when the screen is controlled by Dinesh. Her interaction might now be solely through her device and its small screen.

When Dinesh gets control of the screen, in an alternating manner with Jane, the duration of his control might be specified or determined by some means, prior to him getting control. There could be a standard amount of time that each user gets for exclusive control. Or the amount of time that he gets might be less than Jane's, where this perhaps recognises that Jane was at the screen first. Or he might be able to bid for an amount of time for his duration. Or, instead of having to pay, he might have to reveal his identity to the Broadcaster, who might look at his transaction history. If he has more transactions than Jane, then he might get more time than her.

This can also be used to determine in the first place if Dinesh will get a screen to himself. When Jane has the sole first use of the screen, her losing this control, even temporarily, can be an inconvenience. This can have material effect if she is searching for an item to buy.

This multi-screen usage can be extended to more than 2 users. But if the second user (Dinesh) had to pay or somehow overcome a threshold to gain his temporary screen, then the third user might have to pay more or pass a higher threshold, because the third user inconveniences more users.

The threshold for the second and third (and later) users might be a function of their transaction histories. Like the number of transactions or the monetary totals of those transactions.

Having multi-screens could be combined with having split screens, using the methods of this and the previous section.

4. Spreading an Audio Signal;

Consider in FIG. 1 when Jane is controlling the screen and listening to audio via her mobile device. Suppose Ralph approaches, with his mobile device. He wants to hear the audio. But perhaps the camera on his device does not have enough resolution to image the audio barcode on the screen. He approaches Jane and asks her to check her webpage for the following. There could be an option on that page that, when picked, will show an audio barcode on the screen of Jane's device. Then Ralph is close enough to image that with his device's camera. He then gets the audio signal from the Broadcaster.

Here, an assumption might be that the audio from Jane's device is too soft for Ralph to hear. Or that Jane is reluctant to increase its volume because of the extra power consumption of her device.

A variant on the preceding is where instead of Ralph using a camera to scan a barcode, both his and Jane's device have some other wireless means to transmit the audio URL from her device to his. Whereupon Ralph's device gets the audio signal directly from the Broadcaster, without subsequent intervention by Jane's device.

A variant on the preceding paragraph is where the 2 mobile devices have a wireless means for Jane's device to transmit the audio in some streaming manner to Ralph's device, in addition to playing the audio on Jane's device.

5. Extensions;

In FIG. 1, there might initially be a barcode printed in hardcopy on a surface near Screen 103. And Barcode 104 on Screen 103 would initially be absent. The hardcopy barcode would wrap an URL that lets Jane's Device 102 become the control panel for Screen 103.

Optionally, once Device 102 has the web page control panel, there might appear a barcode on Screen 103, to let other users with suitable mobile devices get an audio feed for Screen 103, in the manner described in Section 1. The appearance of the barcode on Screen 103 might or might not be controllable through actions and feedback done by Jane on Device 102 and transmitted to Broadcaster 105.

Balanced against the use of a hardcopy barcode is that it has several disadvantages. The first is that it commits the Broadcaster to maintain a web server at the barcode's URL. The format of the URL also needs to be supported. Whereas an electronic barcode lets the Broadcaster change web addresses and URL formats.

Another disadvantage is that it requires the hardcopy to be placed somewhere. This can be awkward and constraining, depending on the use of the electronic screen. Suppose the latter is an outdoor billboard. Putting the hardcopy on a solid surface near the billboard can be expensive and hazardous. While putting it at street level exposes it to vandalism. The latter also creates a spoofing risk. Some other entity might put a fake hardcopy barcode in its place, that redirects the unwary user to another URL.

Consider FIG. 1. It shows Jane with one mobile device. Suppose now she has another mobile device, Alpha. It has a camera and can take an image of Barcode 104. Suppose that Device 102 either does not have a camera, or its camera has too low a resolution to fully image and decode Barcode 104. Suppose that Alpha and Device 102 are in a wired or wireless network. Alpha takes an image of Barcode 104 and sends it to Device 102. This might be initiated programmatically by a command from one device to the other. Device 102 then decodes the image and, as earlier, opens a network connection to Broadcaster 105. A variant is where Alpha decodes the barcode and transmits the data to Device 102. Alpha might be a digital camera.

A variant on the previous paragraph is where Alpha and Device 102 are owned by different persons.

I claim:

1. A system comprising:
    at least one monitor adapted to retrieve and display images from a web server; the images containing one or more barcodes encoding, in part, a network address of the web server and a unique identifier of the monitor;
    and at least one mobile device having wireless network access, comprising:
        a camera adapted to scan the one or more barcodes;
        a software adapted to decode each of the one or more barcodes scanned with the camera, and adapted to retrieve information from the web server address obtained from the barcodes; where the information includes web pages and streaming audio;
        and hardware adapted to play streaming audio and to display web pages; where the mobile device uses the web page to control the contents of the monitor;
    where the mobile device uses the web page to alter one or more of the type of barcode encoding, the locations of the barcodes, the resolutions of the barcodes, the duration of the altered barcodes, on the monitor.

2. The system of claim 1 where the mobile device uses the web page to request the web server to divide the monitor screen; the web server allocating a subset ('split screen') of the screen to the control of the mobile device; the web server resizing and re-allocating any pre-existing subsets ('split screens') of the screen controlled by other mobile devices.

3. The system of claim 2, where the images in different split screens are independently manipulated by different mobile devices.

4. The system of claim 2, where different split screens have different associated audio streams; where the web server writes a web page or draws a barcode in a split screen; where a mobile device picks an option on the web page or it images and decodes the barcode, and obtains an audio stream for the given split screen from the web server; where the mobile device plays the audio stream.

5. The system of claim 2, where the allocation of split screens between mobile devices minimises the distances between the known locations of the devices and the centers of the split screens; where the locations of the mobile devices are found by a combination of satellite networks and ground-based wireless networks, and using sensors in the mobile devices.

6. The system of claim 2, where the web server deallocates control of a split screen due to inactivity or a low level of activity by the controlling mobile device; where control is allocated to another mobile device listening to an audio feed from that split screen.

7. The system of claim 6, where the web server queries all devices listening to the audio feed from the split screen, asking for a device to control the split screen; where the web server picks one from among the devices replying in the affirmative, and allocates control.

8. The system of claim 6, where when there is no mobile device listening to an audio feed from the split screen, and no controlling mobile device, the web server closes the split screen and redistributes its area between its neighbours.

9. The system of claim 6, where when there is no mobile device listening to an audio feed from the first split screen, and no controlling mobile device, the web server queries all devices listening to audio feeds of other split screens, but not controlling those screens; where the web server asks for a device to control the first split screen; where the web server picks one from among the devices replying in the affirmative, and allocates control to it of the first split screen.

* * * * *